United States Patent
Rourke et al.

(10) Patent No.: US 11,487,864 B2
(45) Date of Patent: Nov. 1, 2022

(54) PRINT APPARATUS COMPONENT AUTHENTICATION

(71) Applicant: HEWLETT-PACKARD DEVELOPMENT COMPANY, L.P., Spring, TX (US)

(72) Inventors: Kevin Rourke, Leixlip (IE); John McNeilly, Leixlip (IE); Jefferson P Ward, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 257 days.

(21) Appl. No.: 16/606,206

(22) PCT Filed: Oct. 18, 2017

(86) PCT No.: PCT/US2017/057147
§ 371 (c)(1),
(2) Date: Oct. 17, 2019

(87) PCT Pub. No.: WO2019/078840
PCT Pub. Date: Apr. 25, 2019

(65) Prior Publication Data
US 2021/0097165 A1    Apr. 1, 2021

(51) Int. Cl.
*G06F 21/44* (2013.01)
*B41J 2/175* (2006.01)
*G06F 21/70* (2013.01)

(52) U.S. Cl.
CPC .......... *G06F 21/44* (2013.01); *B41J 2/17513* (2013.01); *G06F 21/70* (2013.01)

(58) Field of Classification Search
CPC ........ G06F 21/44; G06F 21/70; B41J 2/17513
USPC .......................................................... 347/19
See application file for complete search history.

(56) References Cited

U.S. PATENT DOCUMENTS

| | | |
|---|---|---|
| 5,187,498 A | 2/1993 | Burger |
| 5,788,388 A | 8/1998 | Cowger et al. |
| 6,431,670 B1 | 8/2002 | Schantz et al. |
| 7,331,645 B2 | 2/2008 | Nishihara |
| 7,542,698 B2 | 6/2009 | Burchette et al. |
| 7,556,326 B2 | 7/2009 | Knierim et al. |
| 9,542,576 B1 | 1/2017 | Ahne et al. |
| 2003/0071862 A1 | 4/2003 | Tsukada |
| 2008/0279373 A1 | 11/2008 | Erhart et al. |

(Continued)

FOREIGN PATENT DOCUMENTS

| | | |
|---|---|---|
| CN | 1460842 | 12/2003 |
| CN | 1488509 | 4/2004 |

(Continued)

OTHER PUBLICATIONS

Vibrating Fork Liquid Level Switch, Dec. 28, 2016, http://www.levelsensor.in/vibrating-fork-liquid-level-switch.html.

*Primary Examiner* — Kristal Feggins
*Assistant Examiner* — Alexander D Shenderov
(74) *Attorney, Agent, or Firm* — Trop Pruner & Hu, P.C.

(57) ABSTRACT

In an example, replaceable print apparatus component authentication apparatus comprises a memory and circuitry. An electrical characteristic of the circuitry may be variable in response to a stimulus, and the memory may store data indicative of an expected variation in the electrical characteristic in response to the stimulus which is associated with a variation in capacitance.

18 Claims, 5 Drawing Sheets

(56) References Cited

U.S. PATENT DOCUMENTS

| | | |
|---|---|---|
| 2012/0317662 A1 | 12/2012 | Neo et al. |
| 2013/0083096 A1* | 4/2013 | Rice .................. G06F 21/44 |
| | | 726/16 |
| 2013/0118254 A1 | 5/2013 | Urban et al. |
| 2014/0085363 A1 | 3/2014 | Van Brocklin |
| 2014/0211241 A1 | 7/2014 | Rice et al. |
| 2015/0362860 A1 | 12/2015 | Anderson et al. |
| 2016/0229179 A1 | 8/2016 | Anderson |
| 2016/0339696 A1 | 11/2016 | Ge et al. |

FOREIGN PATENT DOCUMENTS

| | | |
|---|---|---|
| CN | 1621959 | 6/2005 |
| CN | 1663800 | 9/2005 |
| CN | 102442074 | 5/2012 |
| CN | 103038612 | 4/2013 |
| JP | 2007093456 | 4/2007 |

\* cited by examiner

PRINT APPARATUS COMPONENT AUTHENTICATION

BACKGROUND

Print apparatus may include one or more replaceable print apparatus components, for example print agent containers (e.g. ink or toner cartridges), printhead assemblies and the like. In some examples, such replaceable print apparatus components are provided with a memory to communicate information to a print apparatus. In some examples, the memory comprises authentication information to allow the print apparatus component to be validated and/or authenticated. Such validation may be used to authenticate the source of a replaceable print apparatus component, and thereby enhance a user's experience in terms of reliability, print quality and the like.

BRIEF DESCRIPTION OF THE DRAWINGS

Non-limiting examples will now be described with reference to the accompanying drawings, in which.

DETAILED DESCRIPTION

In some examples, authentication apparatus for replaceable print apparatus components may utilise a measurement of a physical device provided on the print apparatus. For example, the electrical characteristics of an electrical device can provide the basis of an authentication value. A memory may be provided with the replaceable print apparatus component, and may store characteristics of the device. In some examples, the characteristics are stored in a format such that the authenticity of the data is apparent and/or verifiable. Once the replaceable print apparatus component is installed in a print apparatus, a test of the device may be carried out and the result of this test may be compared to an authentication value indicative of an expected response to the test which is stored in the memory. In other examples, authentication apparatus may be used to authenticate the functional status of a component, for example to check the component is in full working order.

Figure 1:
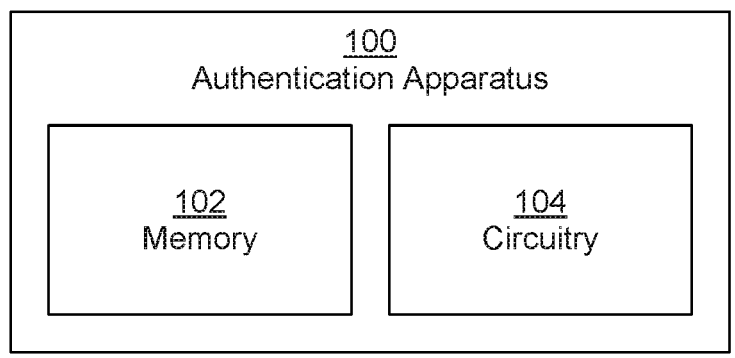
FIG. 1 is an example authentication apparatus for a replaceable print apparatus component.

In examples set out herein, and as illustrated in FIG. 1, replaceable print apparatus component authentication apparatus 100 comprises a memory 102 and a circuitry 104. The circuitry 104 has an electrical characteristic (which may alternatively be termed an electrically detectable characteristic) which is variable in response to a stimulus. For example, the stimulus may be a mechanical or inertial stimulus (for example, stopping or starting movement of the component), or may comprise a magnetic, acoustic, or electronic stimulus. In some examples, the stimulus causes movement of a component of the circuitry 104 when applied.

The memory 102 stores data indicative of an expected variation in the electrical characteristic in response to the stimulus which is associated with a variation in capacitance.

As has been noted above, such apparatus 100 may be used to verify the authenticity of a print apparatus component. In such an example, the electrical characteristic of the circuitry 104 may be a capacitance, for example provided by a vibrating or oscillating member as is further described below.

As briefly mentioned above, in some examples, the circuitry 104 may comprise a vibrating or oscillating element. The behaviour of vibrating elements may be used in some examples to detect the presence of a liquid. For example, a vibrational element such as a 'tuning fork' may vibrate at a resonant or 'natural' frequency in air (or, if stimulated repeatedly with a driving frequency, at that frequency), but in liquid such vibration may be damped. Therefore, the response may be used to indicate if a fluid level is below the height of the vibrating element(s). Fluid level may be detected by use of a vibrating element in various ways, which may be used alone or in combination. For example, when a vibrational element is subjected to a sufficiently energetic impulse in air, it may vibrate at a characteristic resonant or 'natural' frequency. Its deflection may be measured capacitively by providing a capacitive plate on the oscillating element and a second plate which is relatively 'static' (for example being fixedly mounted on a housing, although the housing itself may move). The change in distance between the plates will be observable as a change in capacitance. If by contrast, the vibrational element is subjected to a similar impulse when submerged in liquid, its behaviour will be different. In some examples, the movement will be damped. As is described in greater detail below, different stimuli may be applied to determine the presence, function and characteristics of such a vibrational element, and these may in some examples be verified against expected values.

The memory 102 may store data indicative of at least one of an expected frequency of a response signal, an expected decay rate of a response signal, an expected damping coefficient associated with the response signal, an expected strength of a response signal, an expected value and/or range of the electrical characteristic, or the like. For example, the expected frequency may be the resonant or natural frequency of an oscillating element in air and/or liquid, or expected minimum and maximum natural frequency of the oscillating element in air and/or liquid. The expected damping coefficient may be a damping coefficient in air and/or liquid.

In some examples, parameters associated with different fluid viscosities and/or container size (which may impact the 'wavelength' of the response of a fluid moving in the container) may be provided, for example such that parameters associated with one medium/container can be converted to predicted parameters associated with deployment of a vibrational element in a second medium/container. In some examples, the memory 102 may store data indicative of a fluid level within a container (as the expected response of the circuit may vary with fluid level) and/or information associated with fluid level (such as the amount of print agent provided in the component during manufacture and/or the amount of print agent that may be depleted from the component, for the or each vibrating member, to uncover that member). In some examples, such data may be updated, modified or supplemented as fluid levels change.

In some examples, data stored in the memory 102 may be indicative of, for example, a number of validation devices (for example, oscillating or vibrational members) in authentication circuitry 104, a mounting orientation of such devices, the size, a number of stimuli/stimulus cycles required to obtain a response from the circuit, and/or the like.

In some examples, the memory 102 may store data in such a way that the content of the data may be authenticated. For example, the data may be provided with a digital signature, which may be verifiable by a host device such as a print apparatus using a public key, or communications from the memory may be associated with a Message Authentication Code (MAC), which may be verified by a host device. To that end, the circuitry 104 may comprise a cryptographic module to provide the signature/MAC. In some example, the memory 102 may be encrypted, at least in part. For example, the data indicative of the response signal may be encrypted such that, in order to read the data, a secret key is utilised to decrypt the data.

In some examples, the memory 102 may store data indicative of an expected variation in capacitance of the circuitry 104 to each of a plurality of different stimuli. For example, the memory 102 may store 'signatures' of the response to various different stimuli. For example, one signature may model a response to a sudden stop of the circuitry 104 whereas a second signature may model a response to a more gentle acceleration of the circuitry 104. There may be additional signatures of response, for example to a magnetic excitation of the circuitry 104.

A stimulus applied during verification may take various forms, and may cause a vibrational element to move. For example, an impulse, or sudden force, may be applied by causing a moving component containing a vibrational element to rapidly decelerate, for example by stopping a carriage housing the component (which may be a print apparatus component) suddenly, or by causing the carriage to knock against a stopping member. In other examples, an external device, such as an electromagnet, may be used to generate an impulse force, by generating a magnetic field to act on the distal portion of the a vibrational element then removing the magnetic field, to cause the distal portion to oscillate as it returns to a resting position.

Another way of causing movement of at least part of a vibrational element is to cause movement at a defined driving frequency. In some examples, a direction of movement of a print apparatus component may rapidly and repeatedly be reversed. Such movement may be referred to as cyclic movement. For example, a mechanism for causing a carriage to move within a printing apparatus may cause a fluid container such as a print agent cartridge to move backwards and forwards, for example along a track, at a defined frequency. Fluid, such as print agent within a fluid container, may be caused to slosh from one side of the fluid container to an opposite side of the fluid container at the same defined frequency. The moving liquid may cause a free end of a vibrational element to oscillate at the same frequency.

Figure 2:
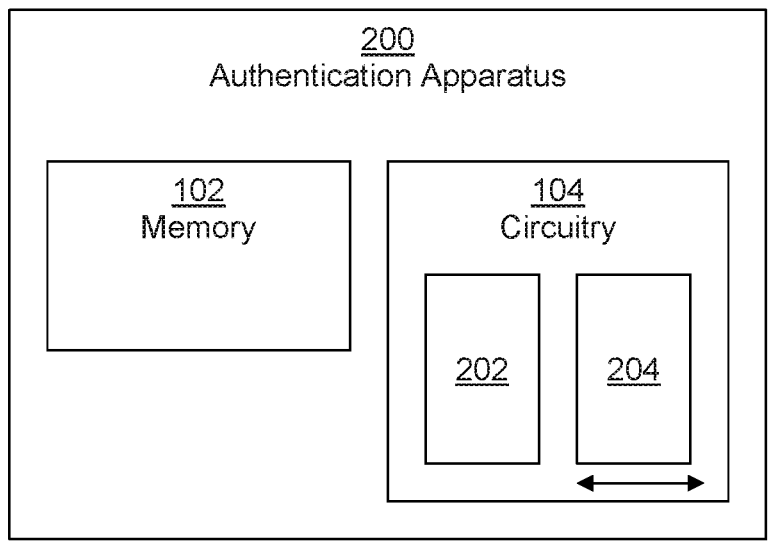
FIG. 2 is another example authentication apparatus for a replaceable print apparatus component.

FIG. 2 shows an example of a print apparatus component authentication apparatus 200 comprising a memory 102 and circuitry 104 as described above. In this example, the circuitry 104 comprises a first electrically conductive element 202, and a second electrically conductive element 204 capacitively coupled to the first electrically conductive element 202. In this example, the second electrically conductive element 204 comprises, or is mounted on, a vibrational member, which may be arranged to vibrate in the manner of a 'tuning fork'.

In some examples, a fluid level within a print apparatus component may be detected using a vibrating element. For example, such a vibrating element may be positioned within a fluid reservoir. In some examples herein, the fluid reservoir is a print agent container for use in printing. For example, in inkjet printing, a print cartridge may contain a supply of ink which is used to form text and images on a substrate. The level of ink in the print cartridge may be used to indicate to the user when the ink is about to run out, or to estimate the rate at which ink is being dispensed.

Thus, the vibrational member of the second electrically conductive element 204 may be used to sense a fluid level in addition to providing an authentication device. For example, the capacitance of the circuitry 104 will vary as the second electrically conductive element 204 moves, changing the distance between the first and second electrically conductive elements 202, 204. The capacitance may be monitored by apparatus (which may for example be provided with a print apparatus in which the print apparatus component associated with the authentication apparatus 200 is to be used), and the signal analysed to determine how the vibrational member reacts to a stimulus. This reaction may in turn be compared to an expected reaction, based on data stored in the memory 102. In some examples, the monitoring apparatus may be coupled to the circuitry 104 directly (i.e. 'galvanically'), or capacitively.

Figure 3:
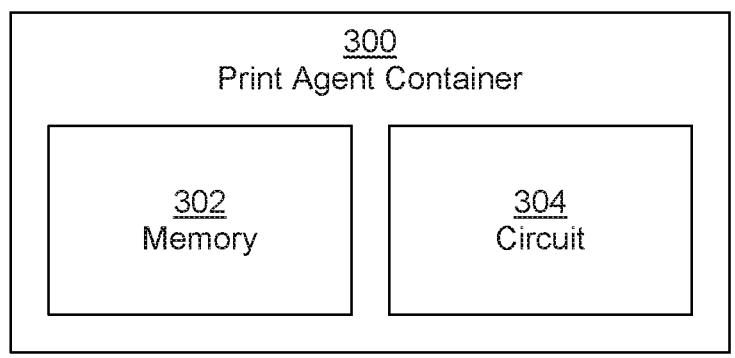
FIG. 3 is an example of a print agent container.

FIG. 3 shows an example of a print agent container 300 comprising a memory 302 and a circuitry 304 wherein an electrical characteristic of the circuitry 304 is variable in response to a stimulus applied to the print agent container 300, and the memory 302 stores data characteristic of an expected variation in capacitance of the circuitry 304 to the stimulus.

Figure 4A:
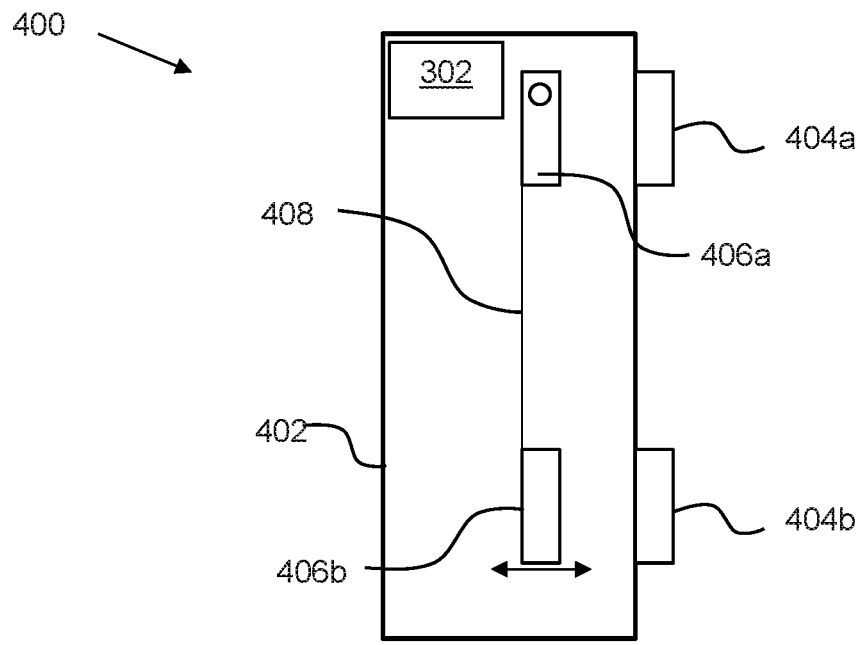
FIG. 4A shows an example of a print agent container.

FIG. 4A shows a further example of a print agent container 400. The print agent container 400 comprises, in addition to a memory 302 as described above, a housing 402, the housing 402 having a first pair of electrical connections 404a, 404b disposed on an outer surface thereof and a second pair of electrical connections 406a, 406b disposed inside the housing 402. Each of the first electrical connections 404 is capacitively coupled to a second electrical connection 406 via the housing 402.

In this example, the second electrical connections 406 are formed at either end of an oscillating member 408 (which may also be described as a vibrational member). One of the second electrical connections 406a is provided at a fixed end of the oscillating member 408 whereas the other of the second electrical connections 406b is provided at an oscillating end of the oscillating member 408. The second electrical connections 406a, 406b are electrically connected by the material of the oscillating member 408 in this example, which comprises a metal, although in other examples they may be connected by a wire or the like.

In some examples, the oscillating member 408 may comprise a stamped spring like component, and/or may be substantially planar. For example, the oscillating member 408 may comprise a stamped spring plate. Providing such a planar sensor may be of use in certain fluid containers (such as print cartridges) which may be constrained in one dimension. In other examples, the oscillating member 408 may comprise a coil spring. In some examples, the oscillating member 408 may be fabricated from a material which is selected for vibrational characteristics and/or corrosion resistance. In some examples this may comprise a metal, for example stainless steel or plastic. The material may be conductive, magnetic and/or ferromagnetic. In other examples, regions of the oscillating member 408 such as the electrical connections 406 may be conductive while other regions are not. The electrical connections 406 may comprise conductive, magnetic and/or ferromagnetic material and may in some examples be fixed mechanically to the oscillating member 408.

In some examples, the oscillating member 408 may have a resonant vibrational frequency on the order of 10 to 100 Hz. This is within the range of frequencies that may be readily fabricated using stainless steel flat springs with dimensions suitable for inclusion in print apparatus, and detection apparatus (for example, analogue to digital converters) which are sensitive to this range are readily available. In addition, it may be noted that oscillating members 408 with higher resonant frequencies have lower displacement for the same quantity of input energy and therefore the movement of an oscillating member 408 becomes more difficult to detect with increasing resonant frequency. Moreover, higher frequencies are associated with higher sampling rates in order to accurately characterise the oscillation. Higher sampling rates in turn consume greater monitoring and processing resource.

The lower end of the frequency range may be associated with the size of the oscillating member (which may in turn be limited by the size of a print apparatus component). Thus, with different processing and/or size constraints, different frequency ranges may be appropriate.

In some examples, frequencies around national power supply frequencies (for example, around 50 Hz and 60 Hz in most countries) may be avoided, as this can result in a false reading due to the power supply signal.

Figure 4B:
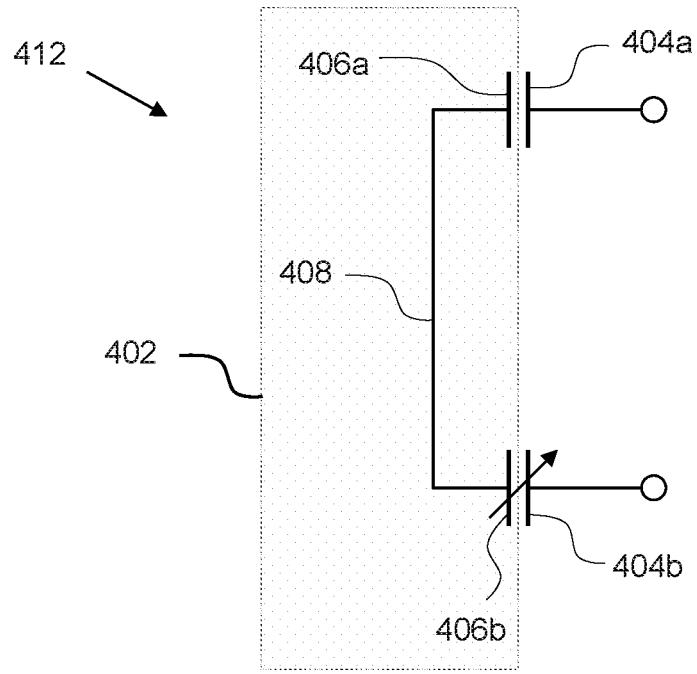
FIG. 4B shows an example of circuitry of a print agent container.

The second electrical connections 406 may be considered as capacitive plates with the opposing plate of each capacitor being provided by the first electrical connections 404. FIG. 4B shows an electrical circuit 412 corresponding to the arrangement shown in FIG. 4A. As has been explained above, as one end of the oscillating member 408 is free to move, this provides a variable capacitor.

In other examples, the connection at the fixed end may be a galvanic connection, i.e. an electrical connection such as a wire, or an electrically conductive via may pass through the housing 402. In still other examples, both ends of the oscillating member 408 may be free to move.

The oscillations of the oscillating member 408 in response to a stimulus are dependent on whether the oscillating member is in liquid or in air. In particular, the oscillating member 408 exhibits, in this example, vibration at a resonant or 'natural' frequency in air but not when submerged in whole or in part in a liquid print agent (when in liquid, the oscillating member 408 may instead oscillate at the natural wave frequency of the liquid). Therefore, the oscillating member 408 may be used as a fluid level sensor: when the print agent falls below the level of the oscillating member 408, it may be determined that the print agent is either being used up at a certain rate or is soon to be fully used up. This may be determined by monitoring the frequency of the variation of capacitance, which may correspond to the resonant frequency once uncovered. The resonant frequency may be characteristic of the oscillating member 408.

As mentioned above, the oscillating member 408 may also be displaced whilst in a fluid. For example if the container 400 is moved in a reciprocating manner, it may be expected that the fluid will 'slosh' from side to side, creating waves within the container 400, where the frequency of the waves will be related to the frequency of the side to side motion and/or to the size of the container 400. This in turn will exert forces on the free end of the oscillating member 408 which may move from side to side. Therefore, detecting a frequency in the variation of the capacitance which corresponds to the frequency of the side to side motion of the container 400 may be indicative of the presence and the correct functioning of the oscillating member 408 and associated circuitry. The magnitude of the capacitance and the variance may be characteristic of the oscillating member 408.

Thus, the capacitance of the circuit 412 provided by the first and second electrical connections 402, 404 as a whole will vary in a manner which is characteristic of the impulse applied, the status of the container 400 (i.e. whether the container 400 is full, partially full or empty) and/or the oscillating member 408. It may be noted that the capacitance, and the nature of the variance thereof in use, may depend on variables such as the viscosity of the liquid and the geometry of the container 400.

The first and second electrical connections 404, 406 therefore form part of a circuit 412 having a variable capacitance.

Figure 5A:
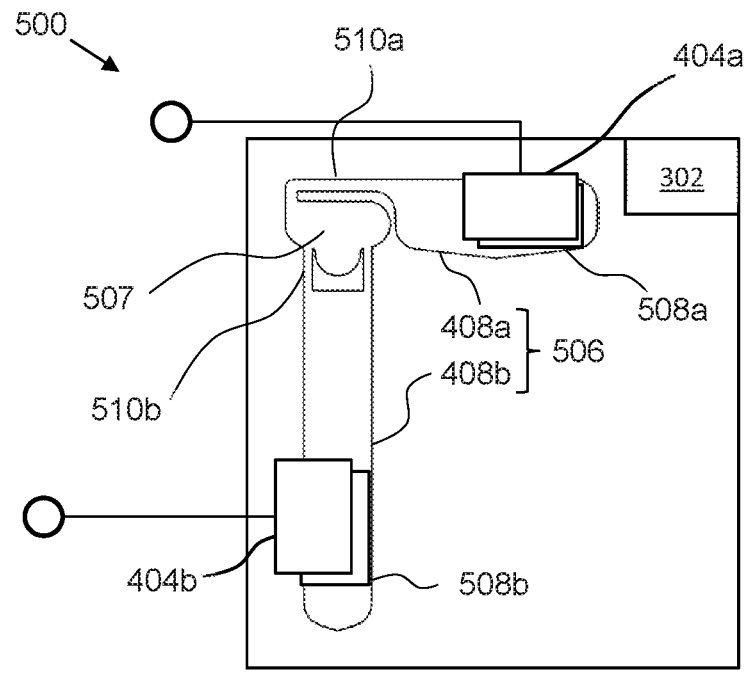
FIG. 5A shows another example of a print agent container.
Figure 5B:
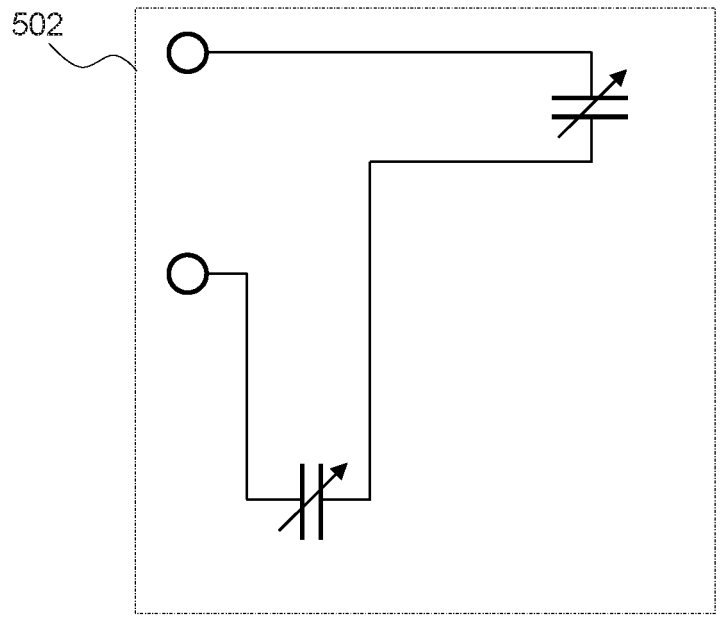
FIG. 5B shows another example of circuitry of the print agent container.
Figure 5C:
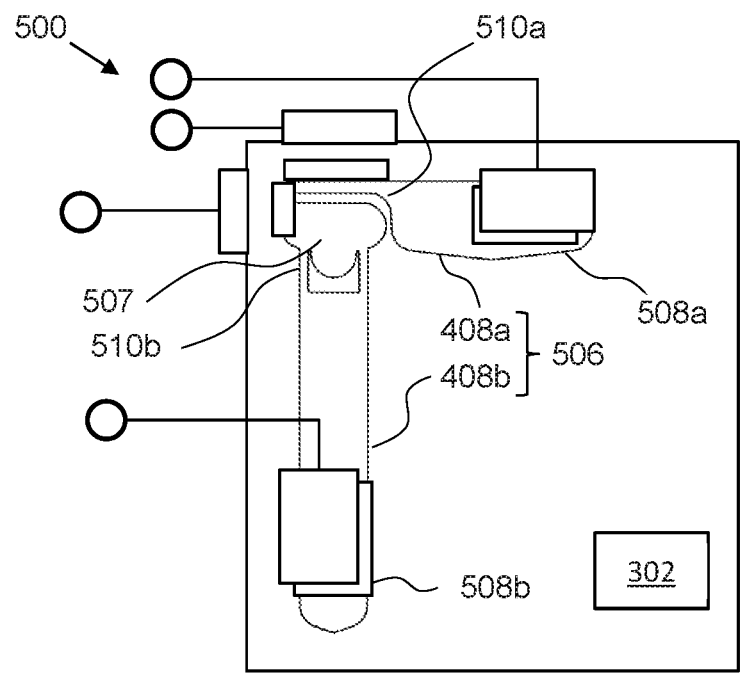
FIG. 5C shows another example of a print agent container.
Figure 5D:
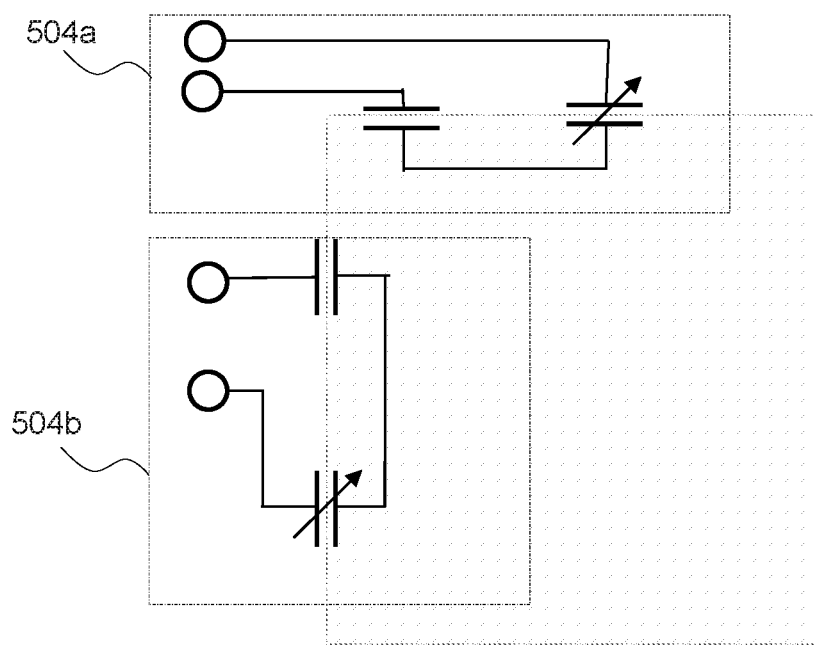
FIG. 5D shows another example of circuitry of the print agent container.

FIGS. 5A and 5B respectively show an example of a print agent container 500 and equivalent electrical circuitry thereof. A variation on this arrangement is shown in FIGS. 5C and 5D. In FIGS. 5A and 5B, the print agent container 500 comprises a memory 302 and circuitry 502 and a fluid level sensor 506. In FIGS. 5C and 5D, a memory 302, first circuit 504a, second circuit 504b and a fluid level sensor 506 are provided. Each of the circuits 502, 504 comprises at least one oscillating member 408a, b of the fluid level sensor 506. The oscillating members 408 of the respective circuits 502, 504 are disposed at different depths within the print agent container 500. Thus, they may display different behaviour as the fluid level decreases.

In FIGS. 5A and 5B, the oscillating member 408a, b are provided in the same circuit 502. In such an example, the response of oscillating members 408a, b may be distinguishable. For example, the oscillating members 408a, b may be manufactured or configured to have distinct resonant frequencies. In other examples, the oscillating members 408a, b may have the same response, and the strength of the response signal could be utilized to determine if just one or both oscillating member 408a, b was responding at its resonant frequency. In FIGS. 5C and 5D, the responses of the oscillating members 408a, b may be acquired separately.

In these examples, the oscillating members 408a, 408b form a two limb fluid level sensor 506, in which the limbs are mounted at a common mounting point 507 and at relatively offset angles. In these examples, the first oscillating member 408a is a substantially horizontal arm and the second oscillating member 408b is a substantially vertical arm. While in this case the arms are substantially orthogonal to one another, this may not be the case in all examples. However, it may be noted that the illustrated design has advantages in nesting in raw material, for example if the sensor 506 is formed using a stamping process. Each of the oscillating members 408 comprises a distal portion 508a, 508b, and a proximal portion 510a, 510b. In each case, the proximal portions 510 are more flexible than the distal portions 512. In the example of the figures, the proximal portions 510a, 510b have a first solid surface area per unit length and the distal portions 508a, 508b have a second solid surface area per unit length, wherein the second solid surface area is greater than the first solid surface area. In other words, the distal portions present a greater surface area against which fluid may act per unit length, and thus act as 'paddles' as they move in the fluid.

In the illustrated examples, the first oscillating member 408a achieves this by having a narrow section forming the proximal portion 510a (i.e., the proximal portion 510 has a first width and the distal portion 508 has a second width, the second width being greater than the first width), whereas the second oscillating member 408b achieves this by having a cut-out section formed in the proximal portion 510b. In other examples, a region of increased flexibility may be provided in some other way, for example through a choice of material. By providing a cut-out rather than a narrowed portion, there may be increased handling robustness in manufacture as the proximal portion 508 is supported on both sides. In addition, a cut out also means that the oscillating member 408 is stiffer rotationally than a narrowed portion of similar cross section, which may assist in reducing torsional and/or longitudinal cross talk.

It may be noted that the various physical characteristics may have an impact on the response of the fluid level sensor 506 to an impulse. For example, providing portions of reduced surface area in a proximal portion may increase signal strength by increasing the flexibility of the oscillating members 408, and the length of such a proximal portion 508, or the amount of material cut-out therefrom, will have an effect on response. Other dimensions and material choices may also have an effect. It may be noted that stiffness is a function of the thickness of the oscillating member 408 to the third power but a function of the width of the oscillating member 408 to the first power, meaning that varying the width may 'fine tune' vibrational performance.

It may be noted that, by providing a plurality of vibrational paddles (as are provided by the distal portions 508a, 508b), the fluid level may be sensed at various heights. For example, it may be determined when the distal portion 508a on the horizontal oscillating member 408 becomes uncovered as a fluid level in a container containing the sensor 506 reduces and, subsequently, it may be determined when the lower distal portion 508b on the vertical oscillating member 408 is uncovered.

The fluid level sensor 506 may comprise a stamped spring plate. By stamping the fluid level sensor 506, it may be formed without requiring joints, hinges or the like.

In these examples, it may be noted that the horizontal oscillating member 408a overreaches the vertical oscillating member 408b and the mounting point 507. This in effect allows the horizontal oscillating member 408a to be longer without increasing the overall footprint of the sensor 506. In this example, it may be noted that the distal portions 508 of the fluid level sensor 506 comprise rounded corners. This may assist in limiting damage to any other components which the fluid level sensor 506 may come into contact with.

In one example, the thickness of each oscillating member 408 may be around 0.5 to 2 mm. The length of each oscillating member 408 may be on the order of 2 to 5 mm, or up to a few centimeters in length.

For example, if, when the print agent container 500 is initially installed in a print apparatus, it is subjected to a side-to-side motion, both of the first and second oscillating members 508a, 508b may be expected to provide a similar response as both may be expected to be submerged, resulting in a change in capacitance with a frequency corresponding to the side to side motion. Once the motion of the print agent container has ceased, there may be a characteristic decay rate to the strength of the signal. In addition, the strength of the signal during the period of stimulation may be characteristic of the form, installation and placement of the respective oscillating members 408.

However, when the upper oscillating member 408a (the oscillating member 408a of the first circuit 504a in FIGS. 5C and 5D) becomes clear of liquid, a stimulus may result in that oscillating member 408a displaying its resonant or natural frequency. In such an example, the frequency of oscillation may be characteristic of the oscillating member 408a. As will be appreciated, the frequency of oscillation will depend on various factors such as the length and the weight of the oscillating member 408, the material used, the weight distribution, et cetera. When in turn the lower oscillating member 408b (the oscillating member 408a of the second circuit 504b in FIGS. 5C and 5D) becomes uncovered, it may have its own characteristic vibrational behavior, which may be the same or may be different from that of the oscillating member 408a.

In examples, the behavior of the circuitry 104, 304, 412, 502, 504 may be verified against information held in the memory 102, 302. Such verification may take place at various stages throughout the life of a replaceable print apparatus component such as a print container 300, 400, 500. For example, on installation of the print agent container 300, 400, 500 in print apparatus, the print agent container 300, 400, 500 may be checked (authenticated or validated) by authentication apparatus of the print apparatus. For example, it may be verified that the cartridge contains circuitry which provides a signal which is indicative of an expected capacitance. In some examples, at least one characteristic such as the expected frequency, strength and/or decay rate of the signal may be verified. As noted above, when a container 300, 400, 500 is full of ink, the expected frequency of the signal may match the frequency with which oscillation is applied to the print agent container 300, 400, 500 and/or which is characteristic of the size of the container. Then, as it is anticipated that an oscillating member 408 becomes uncovered by liquid, a further test may be carried out, for example to detect a resonant frequency. Thus, in some examples, verification may be supplemented or reinforced at various stages in a life cycle of a component.

Other data, such as the presence, placement, number, etc., of detectable elements or members may also be verified against data held in the memory. In some examples, the expected response may depend on a fluid level.

The expected values of such characteristic responses, or parameters derivable therefrom, may be stored, for example in a verifiable and/or encrypted form, in the memory 102, 302. The memory 102, 302 may also hold additional verification details, such as any or any combination of a print agent container identity, print agent type, print agent viscosity and/or characteristic values of other components of the print agent container (for example the behavior of resistors which may be activated to expel ink drops, micro pumps or the like).

In some examples, the expected values may be 'recorded' during manufacture of the oscillating member 408 and/or the print agent container 400, 500. For example, the capacitance, range in capacitance, resonant frequency and/or signal decay rate may be determined prior to or following installation in a print agent container 300, 400, 500. The signal strength and/or baseline capacitance may be measured following installation of the oscillating member 108 into the print agent container 300, 400, 500. The capacitive behaviour of the circuit during a stimulus such as side-to-side reciprocal motion and/or a sudden stop or the like may be measured, for example before and/or after the print agent container 300, 400, 500 has been filled with print agent. Values indicative of these responses may be stored in the memory 102, 302. Values may be required before and/or after filling a container 400, 500 with print agent.

By 'recording' the expected response behavior, the behavior of individual containers may be determined. This means that each memory 302 may be associated with a print agent container 400, 500 which is expected to exhibit a particular behavior.

In some examples, data may be written to the memory 102, 104 during use of the print apparatus component. For example, once a vibrational element has displayed a response corresponding to the natural frequency, it may be expected that the vibrational element will not again be covered with fluid (i.e. it may be intended that a print agent cartridge or the like is not refilled). The memory may be updated with data in relation to the fluid level, for example to remove the 'sloshing' response as an acceptable validation response once vibration at the natural frequency has been detected.

The connection to detection apparatus may for example be a capacitive connection or a galvanic connection. The detection apparatus may for example be provided as part of a print apparatus in which the print apparatus component is to be installed. In other examples, at least one value indicating the expected response of the circuitry may be modelled or estimated, for example based on other similarly constructed print agent containers and/or based on theory or the like.

Figure 6:
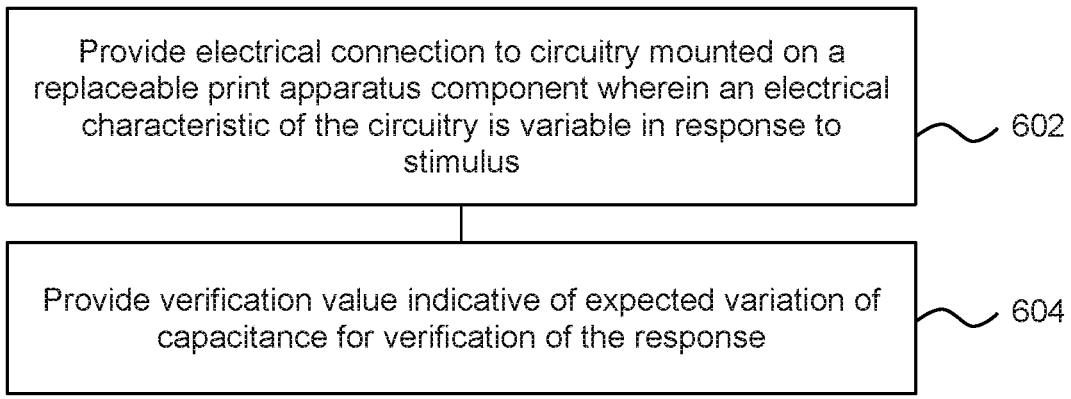
FIG. 6 shows an example of a method of providing an authentication response.

FIG. 6 is an example of a method, which may be a method of providing an authentication response from a replaceable print apparatus component. Block 602 comprises providing an electrical connection to circuitry mounted on a replaceable print apparatus component wherein an electrical characteristic of the circuitry is variable in response to a stimulus. For example, the electrical connection may be an electrical connection provided on an exterior of a housing of a replaceable print apparatus component, for example such as the first electrical connections 406 described above.

Block 604 comprises providing a verification value indicative of an expected variation of capacitance for verification of the response. Such a value may be provided from a memory, in some examples in a cryptographically authenticated, or authenticatable, form. The value may comprise an indication of a capacitance, a strength of the signal, a frequency of the signal, a decay rate of the signal or the like.

Figure 7:
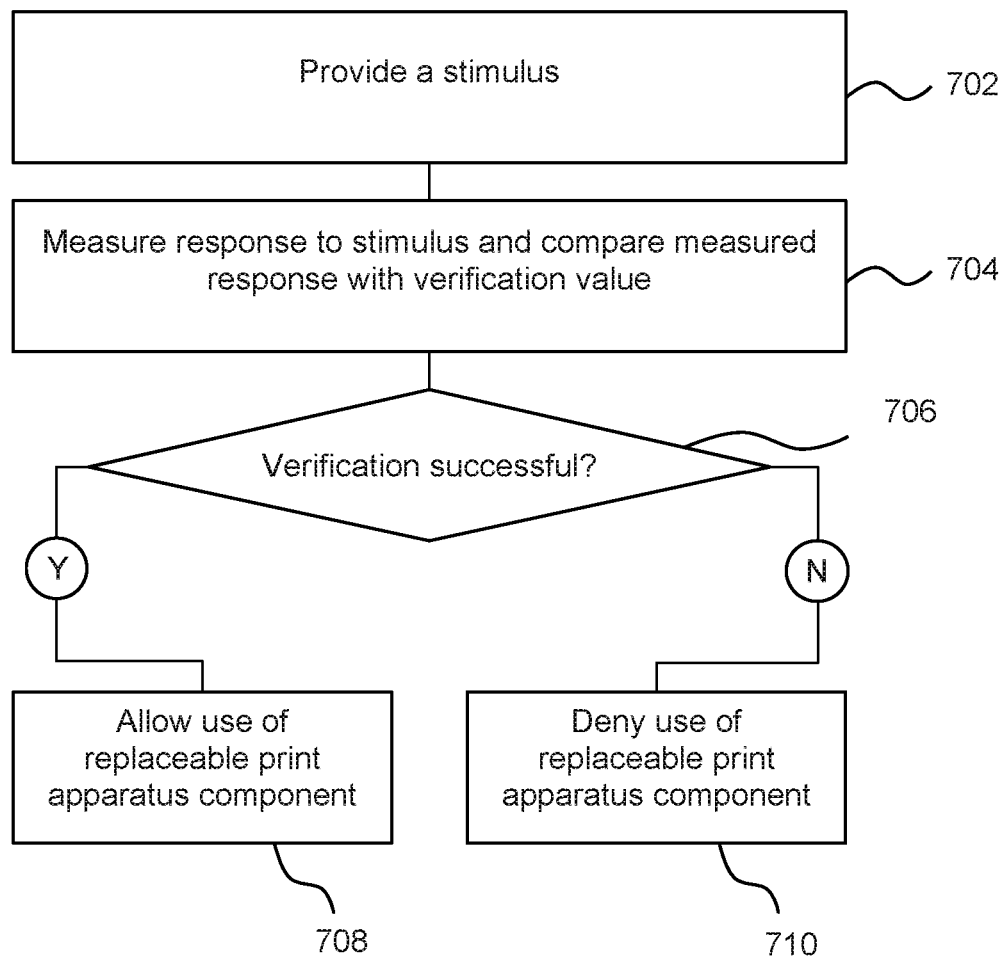
FIG. 7 shows an example of a method of authenticating a replaceable print apparatus component.

FIG. 7 is an example of a method, which may comprise a method of authenticating a replaceable print apparatus component.

In block 702, the method comprises providing a stimulus. The stimulus may comprise any, or any combination of an inertial stimulus, an electrical stimulus and a magnetic stimulus.

Block 704 comprises measuring the response of the circuitry to a stimulus and comparing the measured response with a verification value. The verification value may be a verification value provided by a memory, as described above. As noted above, in some examples, the expected response will depend on the particular stimulus applied. In such examples, the verification value may be associated with the stimulus applied and/or the state of the component (e.g. whether it is expected to be full, partially full, or empty of fluid). In some examples, the verification value may be selected from a plurality of verification values. As noted above, the selectable verification values may be changed in use, for example to reflect a decreasing fluid level.

Block 706 comprises determining if verification is successful. In the event that there is a positive verification, block 708 comprises allowing use of the replaceable print apparatus component by a print apparatus in which the replaceable print apparatus component is installed. If however there is a negative verification, block 710 comprises denying use of the replaceable print apparatus component by a print apparatus in which the replaceable print apparatus component is installed.

FIG. 7 provides just one example of a response to a failure in verification. In other examples, there may be other responses to a negative determination. For example, a user may be notified that the print apparatus component appears to be defective (which may in turn result in an incorrect performance, such as incorrect monitoring of the print agent levels in a print agent container). This may for example allow the user to replace the print agent component with a functioning component (and for example return the print agent container associated with the negative determination to a source).

In some examples, the method of FIG. 7 may be carried out using authentication apparatus of a print apparatus. For example, this may allow a print apparatus to verify the source of a replaceable print apparatus component, such as a print agent source, prior to use, thus in some examples enhancing print quality and minimising any possible adverse effects of using an unauthorised print apparatus component.

Such validation may comprise one or various processes. For example, the presence of a validation device may be detected by determining if the capacitance of a circuitry corresponds to an expected capacitance as held in a memory. It may be noted that the physical characteristics may affect the expected capacitance (for example, the dimensions and materials of any portion of the device which provides a capacitive plate), as well as in some examples the shape: a planar longitudinal member may be bent such that a mounting point and a distal portion are not aligned, for example such that when the mounting point is fixed to a wall of a print apparatus component, the member may be bent such that the distal portion may be spaced from the wall and free to move. In other examples, the mounting may provide the spacing. The spacing distance will affect capacitance.

For example, when a print agent cartridge is inserted into a print apparatus, the presence of circuitry having expected parameters may be verified. In some examples, an impulse and/or cyclic stimulation may be applied and the response compared to an expected response for that print agent container/circuit. Once or as it is expected that a vibrational member may become uncovered, an impulse stimulus (or stimuli) may be applied to determine the point at which the vibrational element is fully uncovered. Once it has been determined that a particular vibrational element is uncovered, a flag may be set such that the response will not be validated if it is indicative that the vibrational element is re-submerged.

It may be appreciated that the illustrated examples provides just some examples of the design options available, and many variations on these designs or combinations of features of different designs could be made.

Examples in the present disclosure can be provided, at least in part, as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts, as well as combinations thereof can be realized by machine readable instructions. Such machine readable instructions may also be used for encryption, decryption and/or data verification in carrying out the method set out herein.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (for example processors connected to the memory 102, 302 or processing apparatus provided in a print apparatus) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A replaceable print apparatus component authentication apparatus comprising:
   a memory and circuitry, wherein the circuitry comprises a movable component that is movable responsive to a stimulus, and an electrical characteristic of the circuitry is variable in response to movement of the movable component responsive to the stimulus, and
   the memory stores data indicative of an expected variation in the electrical characteristic comprising an expected variation in capacitance in response to the stimulus.

2. The replaceable print apparatus component authentication apparatus of claim 1, wherein the circuitry comprises:
   a first electrically conductive element; and
   a second electrically conductive element capacitively coupled to the first electrically conductive element.

3. The replaceable print apparatus component authentication apparatus of claim 2, wherein the second electrically conductive element comprises a vibrational member, the movable component comprising the vibrational member.

4. The replaceable print apparatus component authentication apparatus of claim 1, wherein the memory stores data indicative of at least one of: an expected frequency of a response signal, an expected decay rate of a response signal, or an expected strength of a response signal.

5. The replaceable print apparatus component authentication apparatus of claim 1, wherein the memory stores data indicative of an expected variation in capacitance of the circuitry in response to each respective stimulus of a plurality of different stimuli.

6. The replaceable print apparatus component authentication apparatus of claim 1, comprising second circuitry, wherein the electrical characteristic of the second circuitry is variable in response to the stimulus, and the memory stores data indicative of an expected variation in capacitance in response of the second circuitry to the stimulus.

7. A print agent container comprising:
   a housing, the housing having a first electrical connection disposed on an outer surface of the housing and a second electrical connection disposed inside the housing, wherein the first and second electrical connections are capacitively coupled via the housing;
   a memory; and
   circuitry having a variable capacitance, the circuitry comprising the first electrical connection and the second electrical connection,
   wherein an electrical characteristic of the circuitry is variable in response to a stimulus applied to the print agent container, and the memory stores data characteristic of an expected variation in capacitance of the circuitry to the stimulus.

8. The print agent container of claim 7, wherein the second electrical connection is movable relative to the housing.

9. The print agent container of claim 7, wherein the second electrical connection comprises an oscillating member, and a characteristic of oscillation of the oscillating member in response to the stimulus is dependent on whether the oscillating member is in liquid or in air.

10. The print agent container of claim 7, wherein the data in the memory is cryptographically authenticated and/or verifiable.

11. The print agent container of claim 7, wherein the memory stores data representing expected variations in capacitance of the circuitry to respective different stimuli.

12. The print agent container of claim 7, wherein the circuitry comprises a fluid level sensor.

13. A method comprising:
providing an electrical connection to circuitry mounted on a replaceable print apparatus component, wherein the circuitry comprises a movable component that is movable responsive to a stimulus, and an electrical characteristic of the circuitry is variable in response to movement of the movable component responsive to the stimulus; and
providing a verification value indicative of an expected variation of capacitance for verification of a response of the circuitry to the stimulus.

14. The method of claim 13, wherein the wherein the stimulus comprises at least one of: an inertial stimulus, an electrical stimulus, an acoustic stimulus, or a magnetic stimulus.

15. The method of claim 13, further comprising measuring the response of the circuitry to the stimulus, and comparing the measured response with the verification value.

16. The method of claim 15, further comprising restricting at least one operation of a print apparatus in which the replaceable print apparatus component is installed in the event of in response to a negative verification based on the comparing.

17. The method of claim 13, wherein the verification value is stored in a memory of the replaceable print apparatus component.

18. The method of claim 17, wherein the memory stores different verification values indicative of different expected variations of capacitance in response to respective different stimuli.

* * * * *